United States Patent [19]

Toba et al.

[11] Patent Number: 4,676,976

[45] Date of Patent: Jun. 30, 1987

[54] KONJAK MANNAN-CONTAINING REVERSIBLE GEL

[75] Inventors: Shigeru Toba; Hirono Yoshida; Takehiko Tokita, all of Yokohama, Japan

[73] Assignee: Ajinomoto Co., Inc., Tokyo, Japan

[21] Appl. No.: 837,232

[22] Filed: Mar. 7, 1986

[30] Foreign Application Priority Data

Mar. 8, 1985 [JP]  Japan .................................. 59-45891

[51] Int. Cl.$^4$ ........................ A23L 1/04; A01N 25/00
[52] U.S. Cl. .................................... 424/485; 424/484; 426/573; 426/654; 252/315.01; 252/315.1; 252/315.3
[58] Field of Search .............. 426/573, 575, 579, 654, 426/658; 252/315.01, 315.1, 315.3; 424/34, 35

[56] References Cited

FOREIGN PATENT DOCUMENTS

| 2721199 | 11/1977 | Fed. Rep. of Germany ...... 426/573 |
| 0050864 | 3/1982 | Japan ................................... 426/575 |
| 0050863 | 3/1982 | Japan ................................... 426/575 |
| 0063364 | 4/1983 | Japan ................................... 426/573 |
| 0002162 | 1/1985 | Japan ................................... 426/579 |
| 0217882 | 10/1985 | Japan ................................... 426/575 |

Primary Examiner—Jeanette Hunter
Attorney, Agent, or Firm—Sughrue, Mion, Zinn, Macpeak, and Seas

[57] ABSTRACT

A konjak mannan-containing reversible gel comprising konjak mannan and xanthane gum and free of any alkali agent for solidifying konjak mannan and a process for producing the reversible gel and a foodstuff containing the reversible gel.

11 Claims, 4 Drawing Figures

KONJAK MANNAN-CONTAINING REVERSIBLE GEL

FIELD OF THE INVENTION

The present invention relates to a konjak mannan-containing reversible gel showing the physical characteristics of being in a semi-solid to liquid state upon heating and in a solid state upon cooling.

BACKGROUND OF THE INVENTION

1. Gelation of Konjak Mannan

Konjak is a traditional foodstuff and it has been prepared, roughly speaking, by swelling konjak potato or konjak powder with water, kneading, adding an alkali agent such as lime, kneading and then heating. By gelation of konjak mannan, konjak has a peculiar viscoelasticity.

On the other hand, konjak involves known problems in that (1) an alkaline odor inherent to konjak due to the alkali treatment is generated, (2) water is easily released, (3) it is not resistant to freezing, (4) skill is required for its preparation; in particular, skill is needed for addition of the alkali agent and kneading and, because the reaction rapidly progresses, molding and finishability become poor, etc. For purposes of alleviating the alkali odor, preventing release of water, imparting freezing resistance, improving preparation operations, etc., many investigations have been made. These improvements can be roughly classified as alleviation of the alkali odor by reducing the amount of an alkali agent added, neutralizing after the addition of an alkali agent, treating to remove the alkali, etc. (Published Unexamined Japanese Patent Application Nos. 1752/74, 26882/80, 144070/81, 166965/82, 36366/83, 51866/83, etc.); prevention of water release by adding carrageenan or other agents to prevent release of water (Published Unexamined Japanese Patent Application Nos. 22650/73, 75759/74, etc.); imparting freezing resistance using cyclodextrin and carrageenan in combinaton (Published Unexamined Japanese Patent Application No. 216662/83); etc. In addition, many investigations on improvements have been reported.

These investigations are all, without exception, based on the presumption that gelation of konjak is effected only by treatment with an alkali. Namely, as far as konjak is concerned, it is considered that alkali treatment is mandatory. In fact, no report other than the following example is known with respect to gel formation of konjak mannan without treating with alkali.

Published Unexamined Japanese Patent Application No. 1754/74 discloses that konjak having a good gel strength is obtained without performing an alkali treatment. However, as shown in a Reference Example hereinafter described, the gel strength of the gel of carrageenan and purified konjak powder (weight ratio of 3:2) is reduced to approximately ⅔ with K-carrageenan and approximately 1/10 with I-carrageenan, as compared to that of carrageenan alone (an aqueous solution thereof which is gelled by itself).

Further, the finding that reversible konjak is obtained at a pH lower than a neutral pH is described in Published Unexamined Japanese Patent Application No. 116651/83. Even in this method, the upper limit of the pH is 10 while the lower limit of the pH is set at +0.2; even where the concentration of konjak powder is 4%, a weak, paste-like gel is merely obtained unless an alkali for solidifying konjak, e.g., sodium hydroxide, calcium carbonate, etc., is used in combination.

2. Konjak Mannan-Containing Reversible Gel

Konjak mannan gel obtained by adding water to konjak mannan and treating the thus swollen sol with an alkali is an irreversible gel which shows a strong and elastic solidified state both at room temperature and at high temperatures, about 100° C.

To the contrary, the reversible konjak described in Published Unexamined Japanese Patent Application No. 203467/84 in addition to Published Unexamined Japanese Patent Application No. 116651/83, supra, is known as a reversible konjak mannan gel which varies from a liquid to solidified state depending upon the change in temperature.

(a) Published Unexamined Japanese Patent Application No. 116651/83.

A thermally reversible konjak is disclosed which exists as a liquid to a paste-like state at normal temperature and shows a konjak-like solidified state at 60° C. or higher. This gel has opposite properties to normal gels.

| Process for preparation: konjak potato or konjak powder - (swelling by addition of water) - (adding a catalyst*) - (kneading**) - heat treatment at 70° C. or higher) | |
|---|---|
| *Catalyst: | (1) Sodium citrate, sodium tartarate, sodium malate, sodium lactate, sodium acetate, sodium succinate, etc., or a mixture thereof is used alone or in combination with calcium carbonate or magnesium carbonate. |
| | (2) Sodium polyphosphate, potassium polyphosphate, sodium pyrophosphate, potassium pyrophosphate, sodium metaphosphate, potassium metaphosphate, sodium (mono-, di-, tri-)phosphate, potassium (mono-, di-, tri-)phosphate, ammonium (mono-, di-)phosphate, etc., or a mixture thereof is used alone or in combination with calcium carbonate or magnesium carbonate. |
| | (3) Sodium hydroxide, potassium hydroxide, sodium carbonate, potassium carbonate, calcium hydroxide, calcium carbonate, sodium sulfite, magnesium carbonate, sodium hydrogen carbonate, ammonium hydrogen carbonate, ammonium carbonate or a mixture thereof. |

**pH: pH prior to the addition of the catalyst: +0.2 to 10

(b) Published Unexamined Japanese Patent Application No. 203467/84.

A thermally reversible konjak is disclosed which exists in a semi-solid to a solid state at normal temperature and, in a liquid~paste~semi-solid state prior to chilling to 10° C.

Process for preparation: konjak potato or konjak powder—(swelling by addition of water)—(adding a catalyst*)—(kneading**)—(heat treatment at 50° C. or higher)—(neutralization or treatment for removing alkali)

*same catalyst as described in (1) above **pH of 10.01 to 12.20

3. Gelation of Xanthane Gum

It is known that an aqueous solution of xanthane gum does not form a gel by itself. However, when used in combination with locust bean gum, which is a galactomannan type gum, or a polysaccharide composed of galactose and mannose, a stronger gel is formed. However, it is also known that, when it is used in combination with guar gum which is a galactomannan type gum likewise, a remarkable increase in viscosity is exhibited but no gelation occurs.

On the other hand, no report on gelation using konjak mannan or glucomannan composed of glucose and mannose in combination with xanthane gum has been found. Namely, as described above, the alkali treatment is considered to be essential for gelation of konjak mannan. As a matter of fact, the alkali treatment is performed in the system involving use of xanthane gum in combination with konjak mannan (Published Examined Japanese Patent Application No. 45173/80, Published Unexamined Japanese Patent Application No. 216662/83).

SUMMARY OF THE INVENTION

An object of the invention is to solve the following problems relating to gel formation of konjak mannan due to the conventional alkali treatment.

(1) Alkaline property: Conventionally, konjak is alkaline (pH of 11 or higher), which is a serious limitation in its use because ordinarily a foodstuff is neutral or weakly acidic.

(2) Alkali odor: Due to the peculiar alkali odor, treatment for alleviating an alkali odor such as removal of harsh taste, etc., is often performed while eating. Further even in the case of adding, e.g., various flavors or spices, the flavor and spicy taste is easily damaged.

(3) Water release and freezing resistance: Release of water is serious; when frozen, water release is further accelerated so that freeze resistance is lacking. This is a most serious disadvantage hindering the use of a konjak gel in preservable foods or frozen foods.

(4) Adaptability to preparation and finishing: For preparation, skill is required and in molding, gelation through a rapid alkali reaction proceeds in parallel to the kneading in of the alkali into a highly viscous konjak sol, which is not suitable for continuous preparation or molding.

The present invention solves the foregoing problems collectively by the use of konjak mannan and xanthane gum in combination. Namely, by changing konjak mannan to a firm and stable gel without any alkali treatment, the problems involved in the prior art relative to konjak mannan with respect to alkali odor, strongly alkaline pH, water release, freeze resistance and preparation and finishing adaptability could be solved simultaneously in the present invention. The present invention is directed to konjak mannan-containing reversible gel with thermal reversibility different from the foregoing conventional thermally reversible gel, which is solidified into a konjak-like gel at room temperature to 40° C. but at 50° C. or higher, exists in a liquid~paste-like~semi-solid state.

BRIEF DESCRIPTION OF THE ACCOMPANYING DRAWINGS

FIGS. 1, 2, 3 and 4 show the interaction between konjak mannan and other polysaccharides, the ratio of konjak mannan to xanthane gum and change in physical property (hardness) in the presence or absence of grinding, the change in physical property depending on the heating temperature and the break strength of the gel according to the present invention and a conventional konjak gel, respectively. In FIG. 1, reference numeral in 1 represents K-carrageenan; 2 represents I-carrageenan; 3 represents agar; 4 represents xanthane gum; 5 represents cellulose "MFC"; 6 represents guar gum; 7 represents locust bean gum; 8 represents cellulose "Avicel"; 9 represents pectin; 10 represents tamarind gum; 11 represents Na alginate; and 12 represents pullulan.

DETAILED DESCRIPTION OF THE INVENTION

Table 1 below provides a tubular comparison as to the gel of this invention in relation to known gels.

TABLE 1

| | Konjak Mannan-Containing Reversible Gel | | |
| --- | --- | --- | --- |
| | Present Invention | Published Unexamined Japanese Patent Application 116651/83 | Published Unexamined Japanese Patent Application 203467/84 |
| Addition of Alkali Agent | None | Yes | Yes |
| pH (reaction for preparation) | Acidic - Neutral (less than 7) | Less than 10 | 10.01–12.20 |
| State Change | | | |
| Heating | Liquid–Semi-solid | Solid | Solid |
| Room Temperature | Solid | Liquid–Semi-solid | Semi-solid–Solid |
| Cooling (lower than 10° C. | Solid | Liquid–Semi-solid | Liquid–Semi-solid |
| Freezing | Solid | Liquid–Semi-solid | — |

This gelation is further accelerated by a grinding treatment to form firmer gel. Accordingly, a characteristic of the present invention is by selecting appropriate conditions, gelation is effected by grinding alone without the necessity for any heating step to be performed. The means used for grinding is not particularly limited and sufficient grinding for gelation comprises using a mixer, a juicer, a homogenizer, a food cutter, a speed kneader, a "Robot-Coupe Mixer" (manufactured by T. K. Supplies, K.K.), etc., all of which are commercially available, for 5 seconds to 10 minutes. There is no limitation on the timing for grinding but it is preferably carried out prior to heating, e.g., when grinding is performed in combination with heating.

REFERENCE EXAMPLE 1

Interaction Between Konjak Mannan and Other Polysaccharides

K-carrageenan, I-carrgeenan, agar, microfibrous cellulose "MFC" (manufactured by Daicel Chemical Industry Co., Ltd.), crystalline cellulose "Avicel" (manufactured by Asahi Chemical Industry Co., Ltd.), guar gum, locust bean gum, tamarind gum, gum arabic, pectin, sodium alginate, pullulan and xanthane gum were used as polysaccharides in combination. Water was added in a concentration of 2.0% by weight in a weight ratio of konjak mannan to other polysaccharides of 100:0 to 0:100 to cause swelling. After heating at 90° C.

for 30 minutes, the system was cooled (20° C.), and the physical properties were then measured.

Measurement of Physical Properties

Hardness (g/cm$^2$), using Rheometer (NRM-2002 J) made by Fudo Kogyo K.K., was determined from the value on a chart at the time when the entire portion of a bulb of a plunger (spherical body having a diameter of 10 mm) penetrated the sample. The sample, when the shape was maintained, was cut into a size of 30 mm$\phi \times$ 30 mm; when it was amorphous, the sample was put in a cup of 30 mm$\phi \times$ 30 mm, which was provided for measurement.

Figure 1:
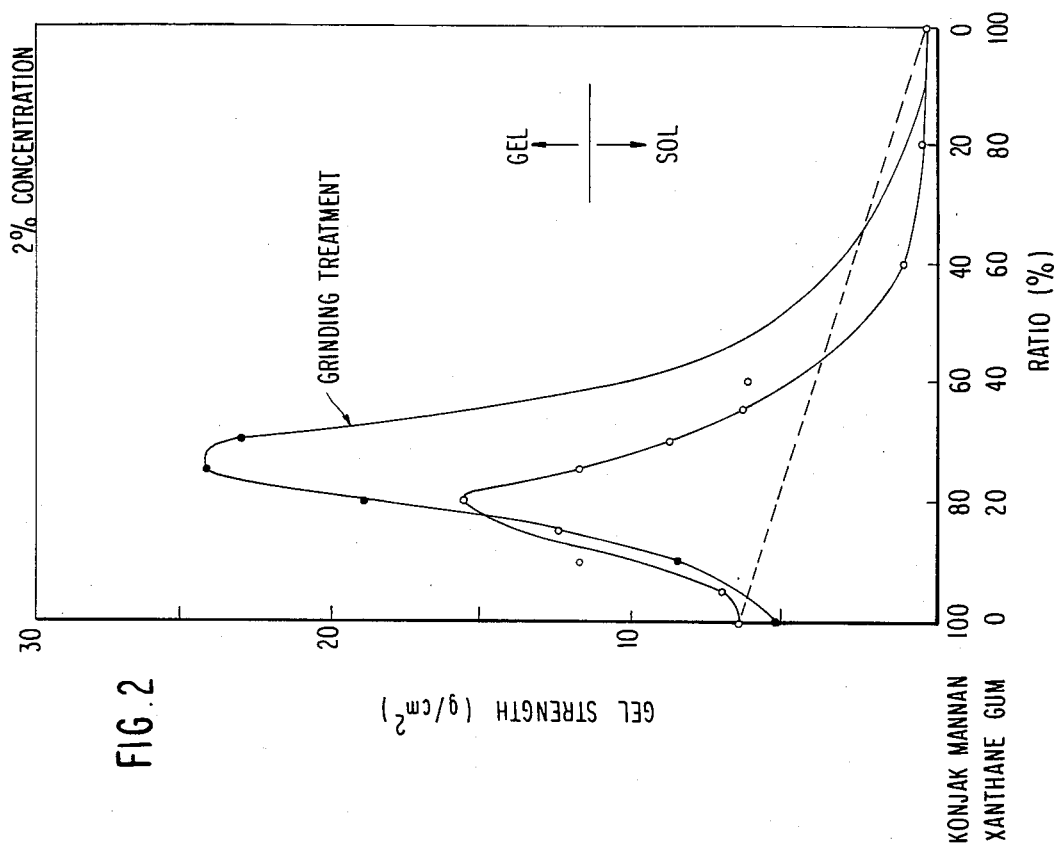

As shown in FIG. 1 and Table 2, the results indicate that gel formation by the use of a polysaccharide in combination was observed only with xanthane gum. In the system using carrageenan or agar in combination, the gel strength was markedly reduced as compared to the system using carrageenan or agar alone. Accordingly, no gelation of konjak mannan occurred by use of these polysaccharides in combination with the konjak mannan. In the system using other polysaccharides in combination, no gel formation occurred regardless of the formulation ratio used.

TABLE 2

| Polysaccharide Used in Combination | pH | Gel Formation Ability of a 2% Solution of Konjak Mannan Without Polysaccharide | Gelation of Konjak Mannan In Combination With Polysaccharide |
|---|---|---|---|
| K-Carrageenan | 6–7 | Positive | Negative |
| I-Carrageenan | 6–7 | Positive | Negative |
| Agar | 6–7 | Positive | Negative |
| Cellulose "MFC" | 5–7 | Negative | Negative |
| Cellulose "Avicel" | 6–7 | Negative | Negative |
| Xanthane Gum | 6–7 | Negative | Positive |
| Guar Gum | 6–7 | Negative | Negative |
| Locust Bean Gum | 6–7 | Negative | Negative |
| Tamarind Gum | 5–7 | Negative | Negative |
| Gum Arabic | 5–7 | Negative | Negative |
| Pectin | 3–6 | Negative | Negative |
| Sodium Alginate | 6–7 | Negative | Negative |
| Pullulan | 6–7 | Negative | Negative |

Konjak mannan which can be used in the present invention may be any of konjak potato, konjak powders, purified konjak mannan, etc., as long as they contain gluocomannan, but konjak powder having a high purity or purified konjak mannan extracted from konjak powder is preferred. Likewise any xanthane gum is usable regardless of the type.

REFERENCE EXAMPLE 2

Weight Ratio of Konjak Mannan to Xanthane Gum

The weight ratio of konjak mannan (made by Gunma Glucomannan K.K.) to xanthane gum was varied from 100:0 to 0:100 and, the gel strength at each ratio was measured.
  Conditions for preparation:
  (1) same as in Reference Example 1;
  (2) same as in Reference Example 1 except that swollen konjak mannan particles were subjected to a grinding treatment followed by a heat treatment at 100° C. for 30 minutes.

Gel strength:
  measured as hardness (g/cm$^2$) under the same condition as in Reference Example 1.

Figure 2:
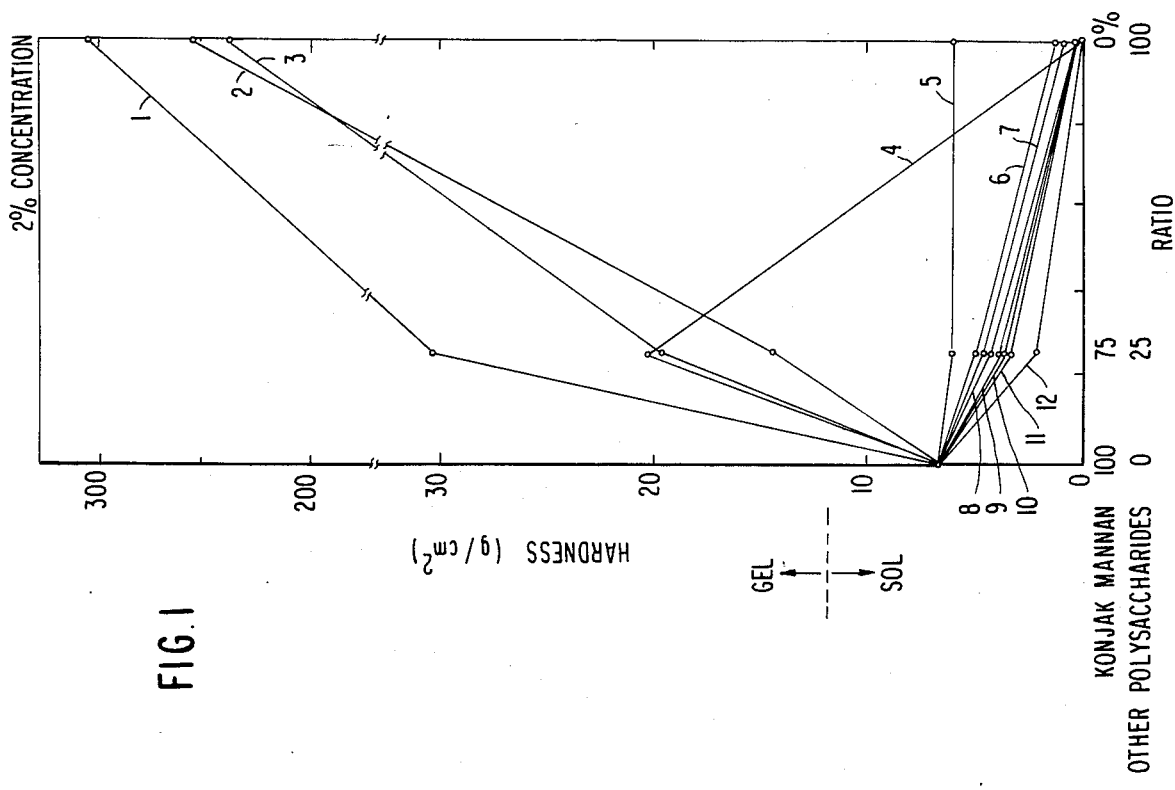
Figure 3:
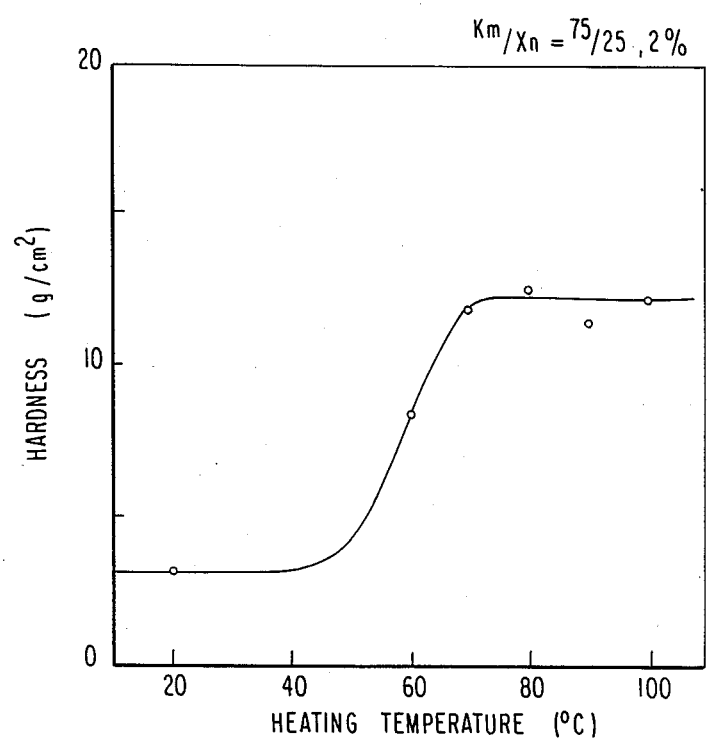

The results shown in FIG. 2 indicate that the best gel strength was obtained with a weight ratio of konjak mannan to xanthane gum of approximately 80:20 to 70:30. Within this ratio, gelation reached the maximum. The weight ratio of konjak mannan to xanthane gum varies depending upon the presence or absence of grinding treatment, upon the pH, etc., but in general, gelation is performed in the ratio of konjak mannan to xanthane gum of 95:5 to 65:35 (weight). Accordingly, the weight ratio of both is 95:5 to 65:35, preferably 80:20 to 70:30. Particularly by affirmatively grinding swollen konjak mannan particles, a much firmer gel is obtained. It is also possible to obtain a gel having an increased weight ratio of xanthane gum to konjak mannan, as compared to the system where no grinding treatment is performed.

REFERENCE EXAMPLE 3

Heating Conditions and pH

Gel strength (measured as hardness in g/cm$^2$) was measured in a weight ratio of konjak mannan to xanthane gum of 75:25 under the same preparation conditions as in Reference Example 1 except that only the heating temperature was varied.

The results shown in FIG. 1 demonstrated that increased hardness was observed at about 50° C. or higher. This indicates that gelation would start at about 50° C.

The lower limit of the heating temperature in preparation of the konjak mannan-containing reversible gel of the present invention varies depending upon the heating time, weight ratio, pH, presence or absence of grinding, etc., and other conditions but heating at about 70° C. or higher is preferred to obtain a stable gel upon cooling.

Also, gel strength (hardness g/cm$^2$ measured by the same method as in Reference Example 1) was measured under the same weight ratio and preparation conditions (pH=6.6) as described above, with the pH alone being changed. The results obtained are shown in Table 3 below. From the results obtained, it is also evident that the gel of the present invention shows stable gel physical properties at acidic to neutral pH's.

TABLE 3

| | pH | | |
|---|---|---|---|
| | 6.6 | 4.9 | 3.6 |
| Hardness (g/cm$^2$) | 11.8 | 12.6 | 9.6 |

REFERENCE EXAMPLE 4

Change in Gel State Due To Change In Temperature

With respect to a gel (pH 6.6) obtained at the same composition under the same preparation conditions as in Reference Example 3, the change in gel state due to heating was measured as a function of gel strength. The results obtained are shown in Table 4 below. A decrease in hardness was observed at temperatures of 50° C. or higher.

The gel of the present invention reversibly changes at temperatures of about 45° C. Namely, it is a solid at temperatures of 40° C. or lower and when it is heated at temperatures of 50° C. or higher, it changes to a semi-solid to liquid. A similar state change is exhibited also by cooling and heating again.

TABLE 4

| | First Time | | | | | | Second Time | | | | | |
|---|---|---|---|---|---|---|---|---|---|---|---|---|
| | 15° C. | 30° C. | 40° C. | 50° C. | 60° C. | 70° C. | 15° C. | 30° C. | 40° C. | 50° C. | 60° C. | 70° C. |
| Hardness (g/cm²) | 12.3 | 11.7 | 10.2 | 5.7 | 3.6 | 3.6 | 12.6 | 12.3 | 11.7 | 7.2 | 4.2 | 3.6 |

REFERENCE EXAMPLE 5

Break Strength of Gel

The break strength was measured at a temperature of 20° C. with the gel (pH 6.6) obtained of the same composition under the same preparation conditions as in Reference Example 3 and with a konjak gel obtained using an alkali treatment as a control.

Preparation of Control

Water was added in a 2% concentration to swell konjak mannan. A 5% aqueous suspension of calcium hydroxide was added to the konjak mannan as a gelling agent followed by immediately homogeneously mixing them. After heating at 90° C. for 30 minutes and then cooling to 20° C., a konjak gel was obtained.

Conditions for Measurement of Break Strength

Using the above-described rheometer, a sample having a size of 30 mmφ×30 mm was penetrated with a plunger (spherical shape having a diameter of 7 mm), where the break strength was determined.

Figure 4:
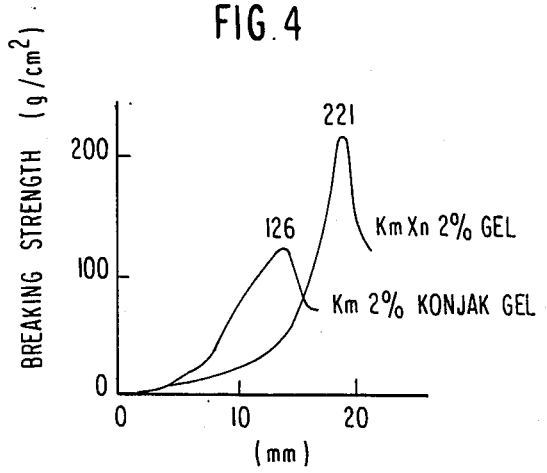

As shown by the results in FIG. 4, the gel of the present invention exhibited a large break strength as compared to the konjak gel obtained in a conventional manner. Further, the distance at which breaking occurred is long, which indicates that the gel has a high degree of elasticity.

REFERENCE EXAMPLE 6

Water Release and Freeze Resistance

With respect to the gel obtained of the same composition under the same preparation conditions (two types of test samples and control) as in Reference Example 5, the rate of water release was measured during storage at a temperature of 44° C. or −25° C. The rate of water release was determined according to the following equation:

$$\text{Rate of Water Release} = \frac{\text{Weight (g) of Water Released}}{\text{Weight (g) of Overall Sample Including Water Released}} \times 100$$

As shown in Tables 5 and 6 below, the results indicate that the konjak gel of the present invention has a lower rate of water release both during storage under severe conditions at a temperature of 44° C. (storage at a temperature of 44° C. for 4 days corresponds to storage at a temperature of 10° C. for 45 days) and during storage under freezing at −25° C. Moreover, no increase in the water release rate was observed even in repeated freezing and thawing. Rather, a high resistance to freezing was exhibited.

TABLE 5

| | Water Release Rate at 44° C. | | | | |
|---|---|---|---|---|---|
| | | Storage Time | | | |
| | Start | 1 Day | 4 Days | 7 Days | 25 Days |
| Water Release Rate: | | | | | |
| Present Invention | 0.3% | 0.5% | 0.5% | 0.8% | 1.5% |
| Control | 0.5% | 6.4% | 14.7% | 15.3% | 17.6% |

TABLE 6

| | Water Release Rate at −25° C. | | |
|---|---|---|---|
| | Cycle | | |
| | Prior to Freezing | First Thawing | Second Thawing |
| Water Release Rate: | | | |
| Present Invention | 0.3% | 12.9% | 13.8% |
| Control | 0.5% | 21.7% | 36.9% |

To prepare the konjak mannan-containing reversible gel of the present invention, the addition of water and incorporation of xanthane gum are performed under conditions such that the konjak mannan particles are sufficiently swollen (accordingly, the xanthane gum may be incorporated prior to or after the addition of water); after uniformly heating, preferably at about 70° C. or higher, cooling to 20° C. is performed. As described below, optimum conditions may be routinely determined depending upon the other components, desired foodstuff, etc.

The konjak mannan-containing gel of the present invention may further contain, if desired, at least one member selected from seasonings (for example, amino acids such as glutamic acid, sodium glutamate; amino acid salts, 5'-ribonucleotides, salt, potassium chloride, etc.), acidic seasonings (for example, various organic acids, vinegar, etc.), sweeteners (for example, sucrose and other sugars, sorbitol, malitol and other sugar alcohols, aspartame, acesulfam, cyclamate, saccharine, sodium saccharine, stebioside, glycosylstebioside, etc.), other seasonings, various extracts (for example, animal and vegetable extracts, Hydrolyzed Amino Protein (HAP), Hydrolyzed Vegetable Protein (HVP), yeast extract, etc.), flavors, spices, fragrances, vitamins, other nutrient-reinforcing components, various pharmaceutical components and colorants. Further by the use of at least one member selected from proteins (for example, soybean protein, flour protein, milk protein, egg protein, fish meat protein, meat protein, etc.) polysaccharides (for example, starches, various pastes, cellulose, etc.), and oils and fats in combination, gels having various physical properties thus can be obtained (needless to say, preservatives and various other agents for improving quality may also be present).

Next, examples of use of the konjak mannan gel of the present invention to foodstuffs are shown below but the present invention is not to be construed to be limited thereto.

(1) Foodstuffs in a gel state at normal temperature to chilled temperature:

jelly, bavaroise, pudding, mousse, yogurt, cheese, egg tofu, soybean tofu, sausage, terrine, hanpen or cake of pounded fish, kamaboko or boiled fish paste, eggroll, Japanese sweet cake, candy, jam, etc. (formulated as a gel-forming component, etc.)

(2) Foodstuffs converted to a liquid to semi-solid state by heating: soup, meltable cheese, etc.

(3) Foodstuffs in which solid, paste and liquid states are co-present:

Shao-mai, Gyoza or fried dumpling stuffed with minced pork, Shao-ryu-pao, meat or fat substitutes in other foodstuffs (incorporated in a finely cut gel state, etc.), granular jelly-containing beverage (incorporated as granular jelly), meat or fat substituted in ham or artificial ham (incorporated in an appropriate shape or as an injectable solution), etc.

The gel obtained using konjak mannan in combination with xanthane gum of this invention exhibits peculiar and excellent effects that are not obtained with konjak mannan gel obtained with the conventional alkali treatment, in that (1) thermal reversibility and a liquid to semi-solid state upon heating and upon cooling, a solid state (and semi-solid also) are exhibited; (2) no alkali odor is present since the gel is formed without any alkali treatment; (3) the gel has stable physical properties at acidic to neutral pH and is applicable widely to conventional foodstuffs; (4) release of water is minimized during storage and in particular, resistance to freezing is excellent; etc. Accordingly, the gel of the present invention can be provided as a foodstuff of an additionally high value beyond use as a known food as konjak, prepared as a health food with a low calorie content, a digestive aid, etc. Thus, its usefulness is obviously clear.

The present invention is described in more detail below with reference to the examples below (wherein konjak mannan and xanthane gum are simply referred to as Km and Xn, respectively).

EXAMPLE 1

Konjak-like Foodstuff

In 1000 g of water were swollen 22.5 g of Km and 7.5 g of Xn. Fifty minutes later, the mixture was ground with a mixer (1000 rpm, 2 minutes) to obtain a somewhat soft gel. The gel was put in a mold followed by steaming at 100° C. for 30 minutes. Thereafter, the system was cooled to obtain a konjak-like foodstuff with an extremely high degree of elasticity. The foodstuff had no alkali odor. After it was stored at 44° C., no release of water was noted. Further, change due to freezing was hardly observed.

EXAMPLE 2

Jelly (Jelly Bean Type)

In 550 g of water were swollen 40 g of Km and 10 g of Xn, during which 1 g of β-carotene was added thereto. The mixture was ground for 2 minutes with a mixer and 400 g of thick malt syrup was added thereto. The mixture was gradually melted by heating over a period of about 30 minutes. To the melt, 10 g of ascorbic acid, 0.3 g of citric acid and 7 g of branched chain amino acids (leucine, isoleucine and valine) were added. The mixture was stirred and then a lemon flavor was added. While hot, the mixture was molded into a vat in a thickness of about 1 cm. After allowing the molding to stand overnight, the content was withdrawn from the vat and cut into a size of about 3 cm×3 cm; thus, an amino acid-enriched jelly was obtained. This jelly had a high water retention as compared to conventional jelly made of agar or pectin. Further, no "weeping" due to exudation, etc., of water from the surface during storage was observed.

EXAMPLE 3

Jelly (Gelatin Type)

After 3 g of Km and 1 g of Xn were swollen in 500 g of water, the mixture was ground for 1 minute with a mixer, then heated and boiled down to about 465 g of solution. After 23 g of sweetner ("Pal Sweet 1/60" trade name for an aspartame type sweetner made by Ajinomoto Ltd.), 0.24 g of citric acid and 0.1 g of grape fruit flavor were added, the mixture was molded into a jelly mold followed by cooling to solidify.

The jelly had an extremely low calorie content and did not melt like gelatin jelly even at room temperature. It had an elasticity-rich texture as compared to agar jelly.

EXAMPLE 4

Jam

After 1.6 g of Km, 0.4 g of Xn and 0.15 g of citric acid were swollen in 300 g of water, the mixture was ground for 1 minute with a mixer and 50 g of strawberries was added thereto. The mixture was boiled down to 300 g finally. Thereto 48 g of sweetner ("Pal Sweet 1/60", made by Ajinomoto Ltd.) was added. After cooling to 50° C. by allowing the mixture to stand at room temperature, the product was gently broken with a mixer to obtain a low calorie jam-like spread.

EXAMPLE 5

Japanese Sweet Cake (kudzu-sakura)

After 3.6 g of Km and 1.2 g of Xn were swollen in 300 g of water, the mixture was ground for 1 minute with a mixer and 40 g of sugar was added thereto. The mixture was heated and melted. Therein 10 g of a sweet bean jam ball was immersed and then withdrawn. The ball was cooled as it was to obtain kudzu-sakura.

The obtained product had a new texture, which was highly elastic, as compared to conventional kudzu-sakura made of kudzu starch and potato starch in combination. However, the appearance, texture and flavor was sufficiently satisfactory as a Japanese sweet cake. Further, handling was easy during preparation without any skill being required. The steps were simple since no steaming was performed.

EXAMPLE 6

Shao-mai

After 1.8 g of Km and 0.6 g of Xn were swollen in 190 g of water, 4 g of pork extract and 0.5 g monosodium glutamate (MSG) were added thereto. The mixture was ground for 2 minutes with a mixer. The mixture was packed in a casing tube and then heated. After cooling, it was minced and 120 g of minced pork (lean meat) was added to 80 g of the minced product. Further, 20 g of spring onion and 10 g of ginger which had been cut into tiny pieces, 30 g of water, 18 g of soy sauce, 15 g of sake, 22 g of potato starch, 12 g of sesame seed oil, 3 g of salt and a small quantity of pepper were added thereto followed by a thorough kneading.

This mixture was covered with Shao-mai skin and steamed to obtain low calorie Shao-mai having a semi-solid Km-Xn gel throughout and having excellent juicy taste and texture. Further, this Shao-mai was thawed by heating after storage while frozen. The quality was not changed but was identical to the quality of the non-frozen product. Both texture and flavor were good.

EXAMPLE 7

Hamburger

After 2.4 of Km and 0.6 g of Xn were swollen in 185 g of water, 4 g of beef extract, 5 g of Worchester sauce and 0.5 g of MSG were added thereto. The mixture was ground for 1 minute with a mixer. Then, the mixture was packed in a casing tube and heated. After cooling, it was minced.

Salt, 3.5 g, was added to 90 g of minced beef lean meat and 90 g of minced pork lean meat followed by thorough kneading and thereto, 100 g of onion cut into tiny pieces and fried in oil, 25 g of bread crumbs immersed in 50 g of milk and 1 egg were added. Further, 120 g of minced Km-Xn gel was added thereto and small amounts of pepper and nutmeg were added. The resulting mixture was molded into a hamburger mold and baked.

By incorporating Km-Xn gel, the calorie content could be reduced by about 30% and hamburger with a rich, juicy taste and capable of storage by freezing was obtained.

EXAMPLE 8

Meltable Cheese

After 3.4 g of Km and 1.1 g of Xn were swollen in 300 g of milk for 40 minutes, the mixture was ground for 1.5 minutes with a mixer. Thereto were added 15 g of corn starch, 6 g of table salt, 10 g of soybean oil, 0.5 g of sucrose ester and 0.4 g of carrot powder. While constantly stirring, the mixture was heated at 90° C. for 15 minutes. Finally, 0.1 g of cheese flavor was added and the mixture was homogeneously mixed. The mixture was extruded in a sheet form and solidified to obtain a low calorie meltable cheese-like foodstuff.

EXAMPLE 9

Margarine

After 140 g of water was added to 1.92 of Km, 0.48 g of Xn, 2.1 g of table salt, 0.4 g of carrot powder and 0.2 g of MSG, the mixture was swollen by stirring for 40 minutes. Next, 15 g of hydrogenated vegetable oil (made by Ajinomoto Ltd., "Hi-tone 10"), 1.0 g of sucrose esters and 0.1 g of butter flavor were added thereto. The mixture was ground and emulsified at 5,000 rpm for 5 minutes with a homogenizer to obtain a margarine-like emulsion. The product obtained was a spread which had a low calorie content of less than 1 kcal/g, which was easy to spread on bread and which melted well in the mouth.

EXAMPLE 10

Spaghetti

After 12 g of Km and 4 g of Xn were swollen with 500 g of water, the mixture was ground for 2 minutes with a blender, to which 100 g of gluten-rich flour "Camelia" (manufactured by Nisshin Seifun K.K.), 100 g of phosphated starch "Neobis C-6" (manufactured by Nisshoku Kako K.K.), 6 g of table salt and a natural yellow colorant were added, followed by thorough kneading. The dough obtained was extrusion molded in a diameter of 2.4 mm and steamed for 10 minutes to obtain a sphaghetti-like foodstuff. This foodstuff had a calorie content of about one-half that of ordinary spaghetti, exhibiting a smooth texture in the mouth and appropriate elasticity.

While the invention has been described in detail and with reference to specific embodiments thereof, it will be apparent to one skilled in the art that changes and modifications can be made therein without departing from the spirit and scope thereof.

What is claimed is:

1. A konjak mannan-containing thermally reversible gel stable at acidic or neutral pH, comprising effective amounts of konjak mannan and xanthane gum as the gelling agents and free of any alkali agent for solidifying konjak mannan.

2. A konjak mannan-containing reversible gel as claimed in claim 1, wherein the weight ratio of konjak mannan to xanthane gum is about 95:5 to about 65:35.

3. A konjak mannan-containing reversible gel as claimed in claim 1, wherein the konjak mannan is konjak potato, konjak powder, purified konjak mannan or mixtures thereof.

4. A process for producing a konjak mannan-containing reversible gel as claimed in claim 1, which comprises adding water to a mixture of konjak mannan and xanthane gum, grinding and/or heating the water-added konjak mannan and xanthane gum without adding thereto any alkali agent for solidifying konjak mannan, and then cooling.

5. A process for producing a konjak mannan-containing reversible gel as claimed in claim 4, wherein the heating is conducted at a temperature of not lower than about 70° C.

6. A process for producing a konjak mannan-containing reversible gel as claimed in claim 4, wherein the weight ratio of konjak mannan to xanthane gum is about 95:5 to 65:35.

7. A process for producing a konjak mannan-containing reversible gel as claimed in claim 4, wherein the process is conducted at an acidic or neutral pH.

8. A process for producing a konjak mannan-containing reversible gel as claimed in claim 4, wherein the konjak mannan is konjak potato, konjak powder, purified konjak mannan or mixtures thereof.

9. A foodstuff comprising a konjak manner-containing reversible gel as claimed in claim 1.

10. A konjak mannan-containing reversible gel composition comprising effective amounts of (1) konjak mannan as a first gelling component, and (2) xanthane gun as a second gelling component and at least one member selected from the group consisting of a seasoning, a flavor, a nutrient-reinforcing component, a pharmaceutical component, a fragrance and a colorant as a third component.

11. A konjak mannan-containing reversible gel composition comprising effective amounts of (1) konjak mannan as a first gelling component, and (2) xanthane gum as a second gelling component, and at least one member selected from the group consisting of a protein, other polysaccharides, oils and fats as a third component and at least one member selected from the group consisting of a seasoning, a flavor, a nutrient-reinforcing component, a pharmaceutical component, a fragrance and a colorant as a fourth component.

* * * * *